(12) United States Patent
Johns et al.

(10) Patent No.: US 7,197,420 B2
(45) Date of Patent: Mar. 27, 2007

(54) METHOD AND APPARATUS FOR ON-CHIP DYNAMIC TEMPERATURE TRACKING

(75) Inventors: Charles Ray Johns, Austin, TX (US); Michael Fan Wang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 11/052,491

(22) Filed: Feb. 4, 2005

(65) Prior Publication Data

US 2006/0178852 A1    Aug. 10, 2006

(51) Int. Cl.
   *G01K 1/00*      (2006.01)
(52) U.S. Cl. ..................................... 702/130
(58) Field of Classification Search ............... 702/130, 702/99; 374/100; 700/276
   See application file for complete search history.

(56) References Cited

U.S. PATENT DOCUMENTS

| | | | | |
|---|---|---|---|---|
| 4,021,722 A | 5/1977 | Crowle | ...... | 323/316 |
| 4,047,435 A | 9/1977 | Keith | ...... | 374/178 |
| 5,980,106 A | 11/1999 | Yamamoto et al. | ...... | 374/178 |
| 6,188,270 B1 | 2/2001 | Boerstler | ...... | 327/543 |
| 6,489,831 B1 | 12/2002 | Matranga et al. | ...... | 327/512 |
| 6,783,274 B2 | 8/2004 | Umeyama et al. | ...... | 374/178 |
| 6,799,889 B2 | 10/2004 | Pennock | ...... | 374/178 |
| 2002/0173930 A1* | 11/2002 | Perner | ...... | 702/130 |
| 2005/0160323 A1* | 7/2005 | Wu et al. | ...... | 714/39 |

OTHER PUBLICATIONS

Merriam-Webster's dictionary Tenth edition, 1993, p. 131.*
Baker, Anton et al. Micropower CMOS Temperature Sensor with Digital Output. IEEE J. Solid State Circuits. Jul. 1996, vol. 31, No. 7, pp. 933-937.
Kuijk, Karel. A Precision Reference Voltage Source. IEEE J. Solid State Circuits. Jun. 1973, vol. 8, No. 3, pp. 222-226.

* cited by examiner

*Primary Examiner*—Bryan Bui
*Assistant Examiner*—Tung S. Lau
(74) *Attorney, Agent, or Firm*—VanLeeuwen & VanLeeuwen; D'Ann N. Rifai

(57) ABSTRACT

A method, computer program product, and apparatus for obtaining a digital temperature reading from within an integrated circuit. In a preferred embodiment, a temperature-stable constant current source is applied to a tapped series of resistors to obtain a set of stable reference voltages. These reference voltages are fed into an analog multiplexer, which selects a single reference voltage to output to a comparator. A PTAT (proportional to absolute temperature) voltage signal is also applied to the comparator, so that the output of the comparator indicates a comparison between the selected reference voltage and the PTAT signal. A digital temperature reading is obtained by using finite-state control to apply test values to the multiplexer in order to search for a value corresponding to a reference voltage that is closest to the value of the PTAT signal. The value that is found is a digital representation of the temperature.

17 Claims, 2 Drawing Sheets

METHOD AND APPARATUS FOR ON-CHIP DYNAMIC TEMPERATURE TRACKING

CROSS-REFERENCE TO RELATED APPLICATIONS

The present application is related to a commonly-assigned, co-pending U.S. patent application entitled "TEMPERATURE SENSING CIRCUITS, AND TEMPERATURE DETECTION CIRCUITS INCLUDING SAME," Ser. No. 11/052,495, filed on the same day as the present application, and incorporated herein by reference in its entirety.

BACKGROUND OF THE INVENTION

1. Technical Field

The present invention relates generally to temperature sensing devices and methods and more specifically to a method of obtaining a digital temperature measurement from an integrated circuit.

2. Description of the Related Art

There are many applications in which the ability to measure the temperature of an integrated circuit is helpful. For example, circuits that generate high power outputs, such as power amplifier circuits, may easily become overheated under high power conditions. Similarly, many modern microprocessors produce significant amounts of thermal energy when operating at today's high clock speeds. In such instances, it is critical to avoid overheating of components.

For example, high-speed microcomputers, and in particular mobile computers such as notebook or laptop computers, are designed to lower the clock rate of the microprocessor when the microprocessor begins to exhibit an overly high temperature.

Existing integrated circuit (IC) temperature sensors tend to be highly complex, and those having digital output are even more complex. Examples of analog IC temperature sensors, which illustrate a variety of complex circuit topologies, include U.S. Pat. Nos. 4,021,722; 4,047,435; 6,188,270; 6,489,831; 6,783,274; 6,799,889; and 5,980,106. One example of an existing digital-output sensor design is provided in BAKKER, Anton, et al. Micropower CMOS Temperature Sensor with Digital Output. *IEEE j. solid-state circuits.* July 1996, vol. 31, no. 7, pp. 933–937. The BAKKER design utilizes a ΣΔ analog-to-digital converter, which imposes a considerable degree of complexity on an already-complex analog sensor design.

Reducing the complexity of temperature sensor circuits is important, as greater complexity often results in physically larger circuits. In large-scale, high power integrated circuits, where multiple temperature sensors are typically needed, these large and complex circuits are expensive and inefficient to produce.

What is needed, therefore, is a simple method of acquiring a digital indication of the temperature of an integrated circuit. The present invention provides a solution to these and other problems, and offers other advantages over previous solutions.

SUMMARY

The present invention provides a method, computer program product, and apparatus for obtaining a digital temperature reading from within an integrated circuit. In a preferred embodiment, a bandgap reference is used to obtain a temperature-stable constant current source, which is applied to a tapped series of resistors to obtain a set of stable reference voltages. These reference voltages are fed into an analog multiplexer, which selects a single reference voltage to output to a comparator. A PTAT (proportional to absolute temperature) voltage signal is also applied to the comparator, so that the output of the comparator indicates a comparison between the selected reference voltage and the PTAT signal. In a preferred embodiment, this PTAT signal is obtained from the bandgap reference itself.

A digital temperature reading is obtained by using finite-state control to apply test values to the multiplexer in order to search for a value corresponding to a reference voltage that is closest to the value of the PTAT signal. The value that is found is a digital representation of the temperature. In a preferred embodiment, a finite-state machine is used to increment and decrement the test value so as to dynamically track the temperature. In an alternative embodiment, the finite-state control may take the form of software.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
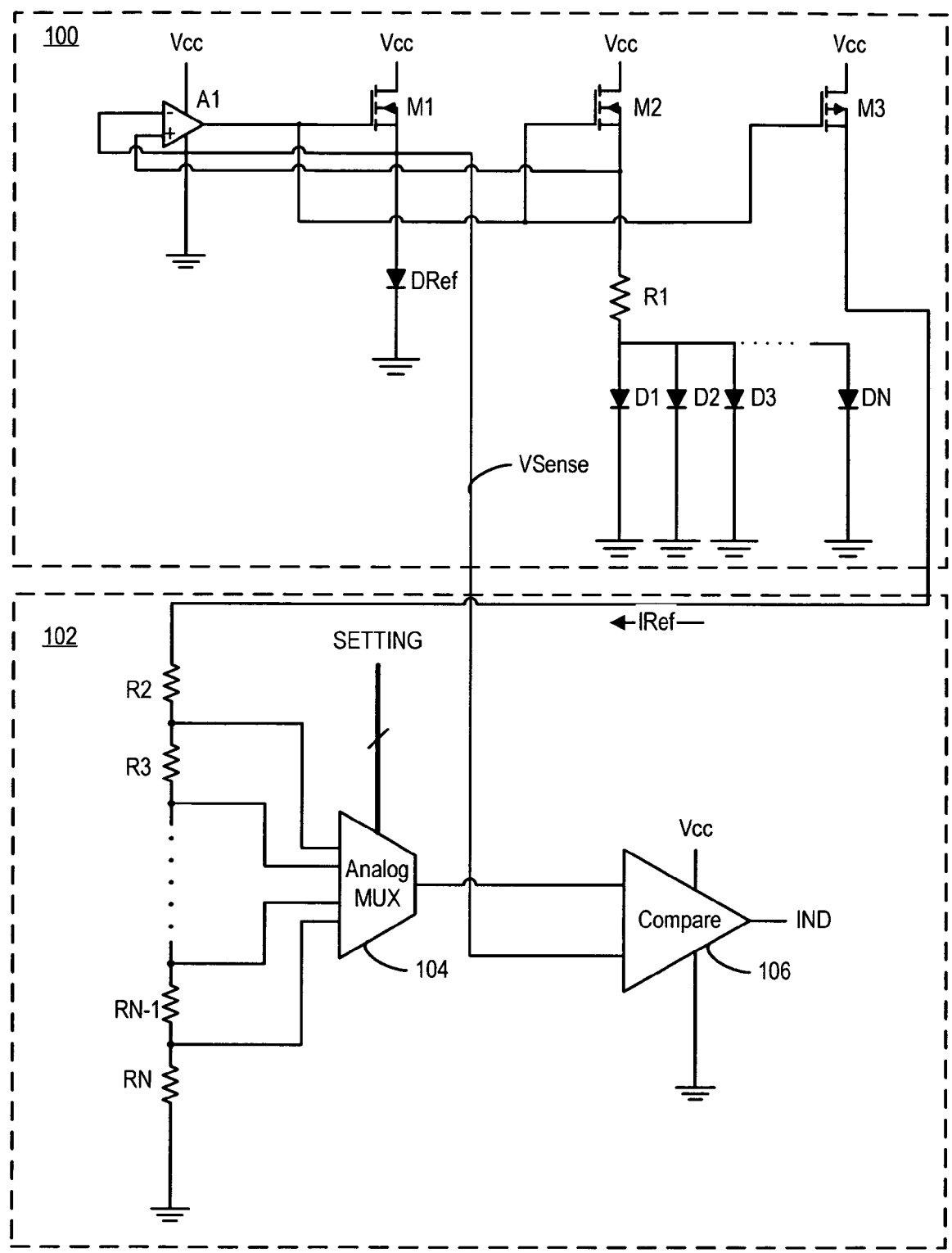
FIG. 1 is a schematic diagram of a temperature sensor in accordance with a preferred embodiment of the present invention.

Turning to FIG. 1, a digital on-chip temperature sensor in accordance with a preferred embodiment of the present invention is depicted. The circuit described in FIG. 1 is composed of two primary modules. Module 100 is a diode-based temperature sensor that creates an analog voltage signal Vsense, which is fed into module 102. Module 102 converts the analog Vsense signal into a digital representation of the temperature measured by module 100.

Turning now to the specifics of module 100, differential amplifier A1, MOSFETs M1 and M2, diodes Dref and D1–DN, and resistor R1 form a bandgap voltage reference circuit of the general type described in KUIJK, Karel. A Precision Reference Voltage Source. *IEEE j. solid-state circuits,* June 1973, vol. 8, no. 3, pp. 222–226. The gates of MOSFETs M1 and M2 are biased by this reference voltage, which is the output of operational amplifier (op-amp) A1, thus causing MOSFETs M1 and M2 to have constant and equal drain currents. The inputs to op-amp A1 are the voltages at the sources of MOSFETs M1 and M2.

When a constant current is passed through a semiconductor diode, the voltage drop across that diode varies with the temperature of the die. This follows from the equation for the current-voltage characteristic of a forward-biased semiconductor diode, which is given as $i=I_s(e^{V/V_T}-1)$ where i is the current passing through the diode, V is the voltage drop across the diode, $I_s$ is a constant, and $V_T$ is the thermal voltage, which varies with temperature. Specifically, the thermal voltage is given by kT/q, where k is Boltzmann's constant measured in coulombs per Kelvin, T is the absolute temperature of the diode in Kelvin, and q is the charge of a single electron in coulombs. Some simple algebraic manipulation reveals that the voltage drop across the diode is approximately directly proportional to the diode's temperature.

The principle behind the bandgap voltage reference circuit is to counteract the temperature-related behavior of a circuit having a positive temperature coefficient (in this case diode DRef, which forms the source circuit of MOSFET M1) with the temperature behavior of the circuit having a negative temperature coefficient, in this case the circuit formed by resistor R1 and diodes D1–DN, which forms the source circuit of MOSFET M2. Since the voltage drop across the source circuit of MOSFET M1 increases with absolute temperature, and the source circuit of MOSFET M2 has a voltage drop that decreases with temperature, the combination of these two voltage drops, which is achieved by op-amp A1, results in an output voltage of op-amp A1 that is relatively temperature-independent. This temperature-independent voltage is then used to set the drain currents of MOSFETs M1, M2, and M3. This bandgap arrangement is used to produce two signals, Vsense and Iref, which are fed into module 102. Signal Vsense is the source voltage at MOSFET M1, and is directly proportional to the absolute temperature (often referred to in the literature as PTAT, which stands for "proportional to absolute temperature"). Current Iref, on the other hand, is a constant, temperature-independent current, being simply the drain current of MOSFET M3.

Module 102 utilizes constant current Iref as a constant, temperature-independent current reference. This current reference feeds into a series arrangement of the resistors R2–RN, which forms a voltage divider with constant temperature-independent voltage drops across each of resistors R2–RN. Each of the voltages in this voltage divider is tapped and fed into an analog multiplexer 104. A binary input value SETTING is used to select one of these voltages from the voltage divider formed by resistors R2–RN. This selected voltage level, which is temperature-independent, is then compared to the temperature-proportional voltage Vsense in comparator 106. The output of comparator 106 is a digital (Boolean logical) signal IND, which is high (logic one) if the temperature-proportional signal Vsense is greater than or equal to the reference voltage level output by analog multiplexer 104.

Figure 2:
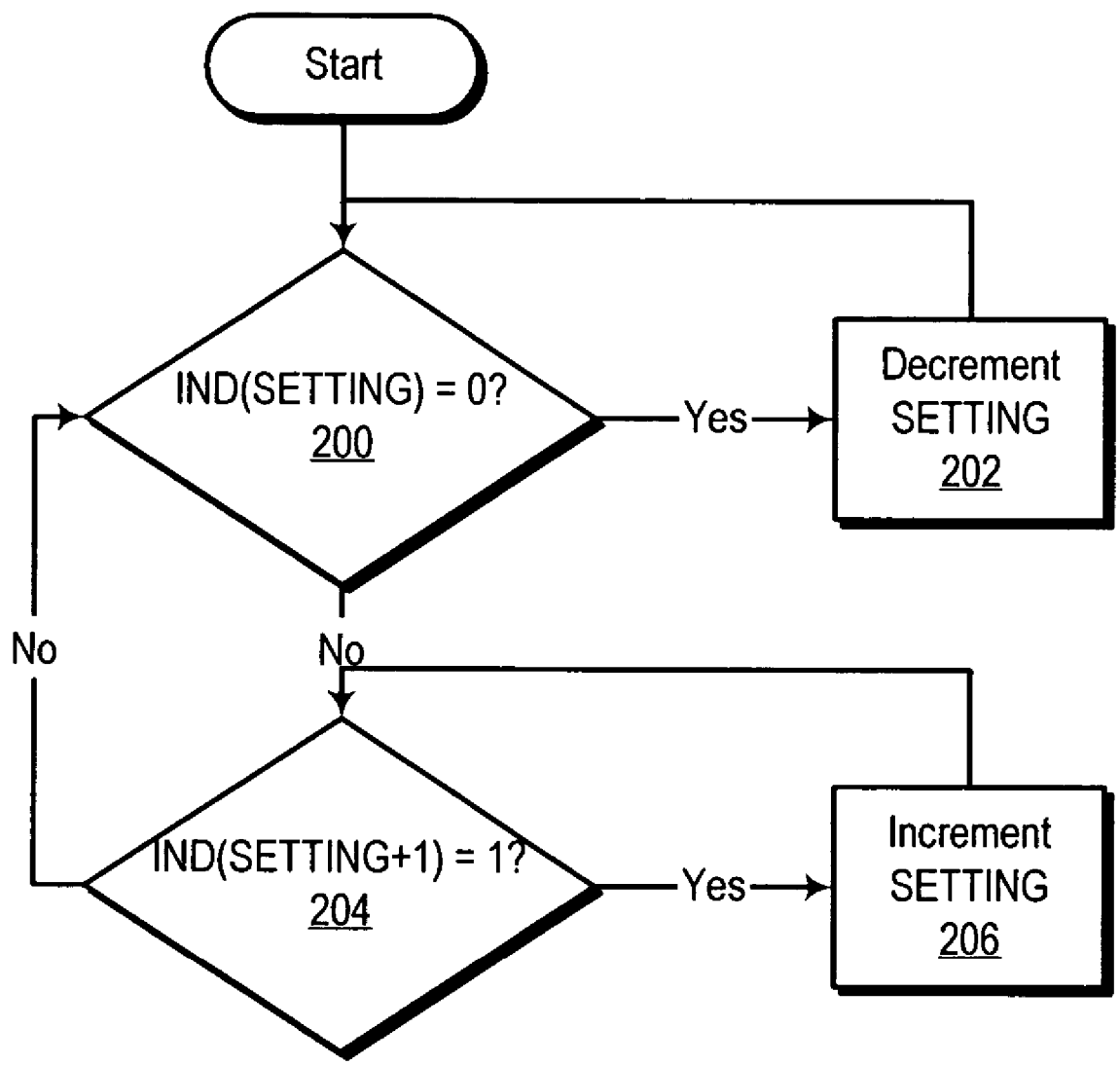
FIG. 2 is a flowchart representation of a process of obtaining a digital temperature reading from a temperature sensor made in accordance with a preferred embodiment of the present invention.

In a preferred embodiment of the present invention, finite-state control is utilized to convert the analog voltage level Vsense into a digital (binary) indication of the current absolute temperature. FIG. 2 is a flowchart representation of the finite-state control utilized to convert temperature-proportional voltage Vsense into a digital temperature reading. In a preferred embodiment of the present invention, the finite-state control specified in FIG. 2 is implemented in the form of a hardware state machine using digital logic. However, as one skilled in the art will recognize, the same finite-state control may be achieved by software executing on a stored-program computing device. For example, in the case of a microprocessor that must monitor its temperature, the process depicted in FIG. 2 may be executed by the microprocessor as a sequence of instructions.

The process depicted in FIG. 2 may also be implemented in a system controller. Most advanced processors have a small controller (system controller) for managing system resources. System controllers are used to boot the processor, control power supplies, control fan speeds, and other similar tasks. These controllers typically use a simple interface (such as JTAG or SPI) to communicate with the main processor. A system controller can be used to monitor the health of the main processor and thus could also be used to monitor the processor's temperature without affecting the program running in the main processor.

The process depicted in FIG. 2 achieves a digital temperature reading by varying the SETTING input to analog multiplexer 104 in FIG. 1. In order to do this, a "current value of SETTING" must be stored in a register, counter, or other form of memory, while modified values of the current value are applied to the SETTING input to analog multiplexer 104. Thus, in the following discussion, the words "current value of SETTING" refer to this value stored in the memory or register, while the actual value applied to the SETTING input of analog multiplexer 104 may differ from the "current value of SETTING" by being, for example, one plus the "current value of SETTING." The register/memory-stored "current value of SETTING" is what becomes the digital temperature reading obtained by the depicted process.

Turning now to the specifics of FIG. 2, the process begins at decision block 200, where a determination is made as to whether the current value of SETTING corresponds to a reference voltage level that is greater than the temperature-proportional voltage Vsense. This is indicated by applying the "current value of SETTING" to analog multiplexer 104 and reading out a signal IND, which will be at a logic-zero level if the temperature-proportional voltage Vsense is less than the reference voltage corresponding to the "current value of SETTING." If this is the case (block 200: yes), then the current temperature is lower than the temperature represented by the "current value of SETTING." Accordingly, the "current value of SETTING" is decremented (block 202) and the process returns to decision block 200. On the other hand, if at decision block 200 signal IND is at logic-one (block 200: no), denoting that temperature-proportional signal Vsense is greater than or equal to the reference voltage corresponding to the "current value of SETTING," the process proceeds to decision block 204.

At decision block 204, a value equal to one plus the "current value of SETTING" is applied to analog multiplexer 104, and the value of signal IND is tested to see if it is at a logic-one level, denoting that temperature-proportional voltage Vsense is greater than or equal to the reference voltage from analog multiplexer 104 corresponding to the value of one plus the "current value of SETTING." If so (block 204: yes), then the current temperature is higher than the temperature represented by the "current value of setting." Accordingly, the "current value of SETTING" is incremented in response (block 206). After the "current value of SETTING" is incremented at block 206, the process returns to decision block 204 to determine if the "current value of SETTING" needs to be incremented again. If the value of signal IND is logic-zero at decision block 204 (block 204: no), the process returns to decision block 200. This endless process causes the value of the "current value of SETTING" to track the current absolute temperature.

As one skilled in the art will recognize, in a preferred embodiment of the present invention, in which the process described in FIG. 2 is implemented in the form of a finite-state machine in digital logic hardware, decision blocks 202 and 204 may correspond to individual states within the finite-state machine.

In a preferred embodiment, the same finite-state control may be used to obtain multiple temperature readings from a plurality of temperature sensors (of the general type described in FIG. 1 or of a different type) positioned at different points in the integrated circuit. When this is done, an array of current SETTING values may be maintained such that each sensor in the integrated circuit corresponds to one SETTING value in the array. To monitor the temperature readings at all of the sensors, each single iteration of the process depicted in FIG. 2 may be performed with respect to a different temperature sensor (and its corresponding SETTING value) in a cyclical fashion, such that the SETTING value for each temperature sensor is updated on a rotating basis. Considering each of a plurality of temperature sensors on a rotating basis is a preferred application of the present invention for two primary reasons. Firstly, the temperature of an integrated circuit does not change rapidly; thus, little accuracy is lost by updating a given temperature sensor's SETTING value on only a rotating basis. Secondly, in the circuit described in FIG. 1 (as well as other temperature sensors of similar construction), a delay is necessary in order to allow the output of the sensor to stabilize; thus, it is efficient to utilize this delay time for obtaining readings from other temperature sensors.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an;" the same holds true for the use in the claims of definite articles.

What is claimed is:

1. A method comprising:
    generating a temperature-dependent signal and an Iref current, wherein the temperature-dependent signal is directly proportional to an absolute temperature and wherein the Iref signal is a constant, temperature-independent current;
    providing the Iref current to a plurality of serially arranged resistors that form a voltage divider with constant temperature-independent voltage drops across each of the plurality of resistors; and
    presenting a digital temperature value based on the temperature-dependent signal, the presenting including:
        using a digital value to obtain a selected reference signal value selected from a plurality of voltages from the voltage divider;
        comparing the selected reference signal value to the temperature-dependent signal value so as to obtain a result of the comparing;
        adjusting the digital value in response to the result of the comparing; and
        repeating the using and comparing steps using the adjusted digital value.

2. The method of claim 1, wherein the digital value is used as an input to an analog multiplexer to select the selected reference signal value.

3. The method of claim 1, wherein the temperature-dependent signal is proportional to absolute temperature (PTAT).

4. The method of claim 1, wherein the result of the comparing is a Boolean value indicating whether one of the temperature-dependent signal value and the selected reference signal value is greater than or equal to another of the temperature-dependent signal value and the selected reference signal value.

5. The method of claim 1, wherein the result of the comparing is a Boolean value indicating whether one of the temperature-dependent signal value and the selected reference signal value is less than or equal to another of the temperature-dependent signal value and the selected reference signal value.

6. The method of claim 1, wherein adjusting the digital value includes one of incrementing the digital value and decrementing the digital value.

7. A computer program product in a computer-readable medium, comprising functional descriptive material that, when executed by a computer, causes the computer to perform actions that include:
    generating a temperature-dependent signal and an Iref current, wherein the temperature-dependent signal is directly proportional to an absolute temperature and wherein the Iref signal is a constant, temperature-independent current;
    providing the Iref current to a plurality of serially arranged resistors that form a voltage divider with constant temperature-independent voltage drops across each of the plurality of resistors; and presenting a digital temperature value based on the temperature-dependent signal, the presenting including:

using a digital value to obtain a selected reference signal value selected from a plurality of voltages from the voltage divider;

comparing the selected reference signal value to the temperature-dependent signal value so as to obtain a result of the comparing;

adjusting the digital value in response to the result of the comparing; and repeating the using and comparing steps using the adjusted digital value.

8. The computer program product of claim 7, wherein the result of the comparing is a Boolean value indicating whether one of the temperature-dependent signal value and the selected reference signal value is greater than or equal to another of the temperature-dependent signal value and the selected reference signal value.

9. The computer program product of claim 7, wherein the result of the comparing is a Boolean value indicating whether one of the temperature-dependent signal value and the selected reference signal value is less than or equal to another of the temperature-dependent signal value and the selected reference signal value.

10. The computer program product of claim 7, wherein adjusting the digital value includes one of incrementing the digital value and decrementing the digital value.

11. A temperature measuring apparatus comprising:
a reference signal source;
a temperature-dependent signal;
a comparator configured to compare the temperature-dependent signal with the output of the reference signal source to obtain a comparison;
finite-state control configured to accept the comparison as input and also configured to control the reference signal source,
wherein the finite-state control applies a digital value to the reference signal source to obtain a selected reference signal as an output of the reference signal source,
wherein the finite-state control adjusts the digital value in accordance with the comparison so as to make the digital value track the temperature-dependent signal, whereby a digital temperature value is obtained;
wherein the finite-state control, when in a first state, determines whether the temperature-dependent signal value is exceeded by the output of the reference signal source;
wherein the finite-state control decrements the digital value if the temperature-dependent signal value is exceeded by the output of the reference signal source as obtained by applying the digital value to the reference signal source;
wherein the finite-state control enters a second state if the temperature-dependent signal value is not exceeded by the output of the reference signal source as obtained by applying the digital value to the reference signal source;
wherein the finite-state control, when in the second state, applies a test value that is greater than the digital value and determines whether the temperature-dependent signal value is exceeded by the output of the reference signal source,
wherein the finite-state control enters the first state if the temperature-dependent signal is exceeded by the output of the reference signal source as obtained by applying the test value to the reference signal source, and
wherein the finite-state control increments the digital value if the temperature-dependent signal is not exceeded by the output of the reference signal source as obtained by applying the test value to the reference signal source.

12. The apparatus of claim 11, wherein the temperature-dependent signal is proportional to absolute temperature (PTAT).

13. The apparatus of claim 11, wherein the selected reference signal value is selected by the reference signal source from a plurality of reference signal values and wherein the plurality of reference signal values are obtained by applying a temperature-stable source to a tapped chain of series-connected resistances.

14. The apparatus of claim 11, wherein the selected reference signal value is derived from a temperature-independent bandgap signal reference.

15. The apparatus of claim 14, wherein the temperature-dependent signal is obtained from a proportional to absolute temperature (PTAT) component of the temperature-independent bandgap signal reference.

16. An apparatus comprising:
a first temperature sensor, wherein the first temperature sensor takes a temperature value as an input and produces a Boolean output that indicates a comparison between the temperature value and a current temperature of the first temperature sensor, the first temperature sensor including:
a temperature-dependent signal and an Iref current, wherein the temperature-dependent signal is directly proportional to an absolute temperature and wherein the Iref signal is a constant, temperature-independent current;
a plurality of serially arranged resistors that receive the Iref current, the serially arranged resistors forming a voltage divider with constant temperature-independent voltage drops across each of the plurality of resistors;
a multiplexer that selects a reference signal value from a plurality of voltages from the voltage divider based upon a digital value; and
a comparator that compares the selected reference signal value to the temperature-dependent signal value so as to obtain the Boolean output; and
a finite-state control, wherein the finite-state control obtains a temperature reading by applying test values to the input of the first temperature sensor and adjusting the temperature reading in accordance with the Boolean output.

17. The apparatus of claim 16, further comprising:
a second temperature sensor, wherein the finite-state control obtains a second temperature associated with the second temperature sensor by applying test values to an input of the second temperature sensor and adjusting the second temperature reading in accordance with an output of the second temperature sensor.

* * * * *